United States Patent [19]
Collentro et al.

[11] Patent Number: 5,766,479
[45] Date of Patent: Jun. 16, 1998

[54] PRODUCTION OF HIGH PURITY WATER USING REVERSE OSMOSIS

[75] Inventors: William V. Collentro, New Hope, Pa.; Andrew W. Collentro, Newton, Mass.

[73] Assignee: Zenon Environmental Inc., Burlington, Canada

[21] Appl. No.: 512,109

[22] Filed: Aug. 7, 1995

[51] Int. Cl.$^6$ ............................................. B01D 61/58
[52] U.S. Cl. ........................ 210/639; 210/641; 210/651; 210/900
[58] Field of Search ...................... 210/634, 641, 210/651, 652, 259, 195.2, 638, 806, 900

[56] References Cited

U.S. PATENT DOCUMENTS

| | | | |
|---|---|---|---|
| 3,639,231 | 2/1972 | Bresler | 210/259 X |
| 3,774,763 | 11/1973 | Yall et al. | |
| 3,776,842 | 12/1973 | Grimme, Jr. | |
| 3,823,086 | 7/1974 | Schmidt | |
| 3,870,033 | 3/1975 | Faylor et al. | 210/900 |
| 4,014,787 | 3/1977 | Shorr | |
| 4,046,685 | 9/1977 | Bray | |
| 4,115,274 | 9/1978 | Boddeker et al. | |
| 4,160,727 | 7/1979 | Harris | |
| 4,188,291 | 2/1980 | Anderson | |
| 4,243,523 | 1/1981 | Pelmulder | |
| 4,255,263 | 3/1981 | Galimi et al. | |
| 4,261,833 | 4/1981 | Pohl et al. | |
| 4,277,336 | 7/1981 | Henschel, Jr. | |
| 4,289,617 | 9/1981 | Davis | |
| 4,313,830 | 2/1982 | Tulin et al. | |
| 4,332,685 | 6/1982 | Nowlin et al. | |
| 4,392,959 | 7/1983 | Coillet | 210/638 |
| 4,434,057 | 2/1984 | Marquardt | |
| 4,574,049 | 3/1986 | Pittner | |
| 4,808,287 | 2/1989 | Hark | 210/900 |
| 4,877,091 | 10/1989 | Pasternak et al. | |
| 4,879,041 | 11/1989 | Kurokawa et al. | 210/900 |
| 5,078,755 | 1/1992 | Tozawa et al. | |
| 5,106,754 | 4/1992 | Steele et al. | |
| 5,116,507 | 5/1992 | Ebbins et al. | |
| 5,156,739 | 10/1992 | Dawson et al. | |
| 5,250,183 | 10/1993 | Sawada et al. | |
| 5,254,143 | 10/1993 | Anazawa et al. | |
| 5,306,427 | 4/1994 | Xu | |
| 5,338,456 | 8/1994 | Stivers | |
| 5,413,763 | 5/1995 | Jeffers | |
| 5,670,053 | 9/1997 | Collentro et al. | 210/651 |

FOREIGN PATENT DOCUMENTS

| | | |
|---|---|---|
| 63-22802 | 6/1988 | Japan |
| 422490 | 5/1990 | Japan |
| 4176303 | 6/1992 | Japan |

OTHER PUBLICATIONS

Tai et al. "Removal of Dissolved Oxygen in Ultrapure Water Production Using Microporous Membrane Modules", J. Membrane Sci. 37 (1994)99–105.

Primary Examiner—Joseph W. Drodge
Attorney, Agent, or Firm—Andrew Alexander

[57] ABSTRACT

A process for purifying water by removing dissolved materials therefrom, the process capable of producing purified water having a resistivity in the range of 2 to 10 megohm-cm. The process comprises providing a water feed stream to be purified and adjusting the pH of the water feed stream to a basic water solution to drive the equilibrium of a first weakly ionized material to become ionized in the basic solution. The basic water solution is introduced to a high pressure side of a first reverse osmosis membrane module and water is passed through the first reverse osmosis membrane to provide a first retentate having ions therein from the first weakly ionized material concentrated therein and a first permeate depleted in ions from the first weakly ionized material. The pH of the first permeate is adjusted to an acidic water solution to drive the equilibrium of a second weakly ionized material to become ionized in an acidic solution. The acidic water solution is transferred to the high pressure side of a second reverse osmosis membrane and the acidic water solution is purified by passing at least a portion thereof through the second reverse osmosis membrane to provide a second retentate containing ions of the second weakly ionized material ionized in the acidic solution and provide a second permeate depleted in the ions from the second weakly ionized material, the second permeate having a resistivity in the range of 1 to greater than 10 megohm-cm.

18 Claims, 2 Drawing Sheets

PRODUCTION OF HIGH PURITY WATER USING REVERSE OSMOSIS

BACKGROUND OF THE INVENTION

This invention relates to water purification and more particularly, it relates to purification of water to remove materials such as carbon dioxide, ammonia and other weakly ionized material using reverse osmosis membranes.

The presence of carbon dioxide and/or ammonia gas in water greatly limits the ability to produce high purity water, for example, having a resistivity greater than 4 megohm-cm. Even the ability of a double pass reverse osmosis unit to produce high purity water (greater than 1 megohm-cm resistivity) is greatly limited by the presence of carbon dioxide or ammonia and other weakly ionized material.

Carbon dioxide reacts with water in an equilibrium reaction with associated ionization constant, producing hydronium ions and bicarbonate ions. For many water supplies, the percentage of bicarbonate (generally measured and expressed as "methyl orange" alkalinity) is a relatively high percentage of the anions present. This is particularly true as the total dissolved solid level increases. For liver water and ground water supplies, the bicarbonate ion is generally a significant percentage of the total anions. The amount of carbon dioxide related to the bicarbonate ion is a direct function of the pH value because lower pH values are associated with a higher concentration of the hydronium ion, with resulting higher concentrations of carbon dioxide.

Carbon dioxide or ammonia and weakly ionized material are difficult to remove from water. For example, carbon dioxide or ammonia, as a gas, pass directly through a conventional brackish water reverse osmosis membrane used in conventional double pass, product staged reverse osmosis units. There is insufficient time while passing through the membrane for equilibrium to re-establish. Unlike the relatively slow ion exchange process which will remove carbon dioxide as the bicarbonate ion, reverse osmosis membranes will not. As a result, the product water purity from a double pass product stage reverse osmosis unit is dependent on the carbon dioxide and ammonia concentration in the feedwater. That is, the carbon dioxide, ammonia and other weakly ionized material pass through the reverse osmosis system and re-establish an equilibrium in the product water, decreasing the resistivity.

Attempts at removing carbon dioxide in the past have only been partially successful and often end up further contaminating the water. For example, U.S. Pat. No. 4,574,049 discloses a process for removing carbon dioxide and other impurities from a water supply using double pass reverse osmosis membranes. The process includes providing a first reverse osmosis unit having an inlet, a product outlet and a brine outlet; providing a second reverse osmosis unit having an inlet, a product outlet and a brine outlet; locating the second reverse osmosis unit downstream of the first reverse osmosis unit with the product outlet of the first reverse osmosis unit being coupled to the inlet of second reverse osmosis unit; providing water to be purified to the inlet of first reverse osmosis unit; treating the product from the reverse osmosis unit at a location upstream of second reverse osmosis unit with a chemical treatment agent comprising a solution having a pH that exceeds 7 to reduce carbon dioxide concentration of the product by chemical conversion and to ionize certain otherwise difficult to remove chemicals; and directing the product from second reverse osmosis unit toward a point of use or storage for purified water.

However, this process which normally uses sodium hydroxide for increasing the pH results in the addition of sodium which, because of its small ionic radius, is difficult to remove by subsequent membranes. Further, the addition of sodium hydroxide has another disadvantage in that the series of reactions removing carbon dioxide are relatively slow when compared to reverse osmosis unit contact time. Thus, the effectiveness of the operation is limited by the sodium hydroxide reactions, and further, this process does not remove ammonia.

U.S. Pat. No. 5,338,456 discloses a water purification process for removing dissolved solids of the type that are normally present in a municipal or similar water supply. The process uses a forced draft decarbonator having an inlet and a product outlet, a vacuum degasifier having an inlet, a product outlet and a water level sensor, and a reverse osmosis unit having an inlet, a product outlet and a brine outlet. The vacuum degasifier is located downstream of the forced draft decarbonator with the product outlet of the forced draft decarbonator being coupled to the inlet of the vacuum degasifier. The reverse osmosis unit is located downstream of the vacuum degasifier with the product outlet of the vacuum degasifier being coupled to the inlet of the reverse osmosis unit. Water to be purified is provided to the inlet of the forced draft decarbonator at a predetermined rate. According to the invention, the rate at which water to be purified is provided to the inlet of the forced draft decarbonator is a function of a predetermined water level in the vacuum degasifier.

Japanese Patent 4-22490 discloses a pre-stage reverse osmosis membrane module, a post-stage reverse osmosis membrane module and a hydrophobic porous membrane module, to which an aqueous alkali solution circulating line is attached in the permeate side. That is, Japanese Patent 4-22490 utilizes an alkali solution in the permeate side to remove dissolved carbon dioxide by chemical reaction. The hydrophobic porous membrane module is placed between the pre-stage module and the post-stage module and has pores capable of permeating only gases. An inert gas blowing pipe is installed to the alkali aqueous solution circulating line.

Japanese Patent 2-2802 discloses reverse osmosis separator membrane module and degassing membrane module arranged in treating water line in series. The degassing membrane is formed by a porous supporter layer and high molecular homogeneous layer or minute layer arranged on the supporter layer. Oxygen separating coefficient of the degassing membrane is not less than 1.3.

U.S. Pat. No. 4,897,091 discloses that gases such as carbon dioxide may be separated from rich liquor (such as methanol containing carbon dioxide) by passage of gas through a membrane which is the reaction product of (i) a polyamine and (ii) a polyisocyanate or a poly (carbonyl chloride).

U.S. Pat. No. 5,078,755 discloses removing dissolved gas from liquid, which comprises bringing the liquid containing the gas dissolved therein into contact with a membrane, thereby causing the dissolved gas to selectively permeate the membrane. The membrane is a permselective, composite membrane composed of a porous support and a nonporous, active membrane of a synthetic resin formed on the porous support, or is a permeable membrane having such characteristics that the nitrogen gas permeation rate at 30° C. is in the range from $7 \times 10^4$ to $2 \times 10^2$ $Nm^3 m^2 \cdot h \cdot atom$ and that the amount of permeated stream is 100 $g/m^2 \cdot h$ or less when 20° C. water is supplied to the membrane under atmospheric pressure while maintaining the pressure on its permeate side at 40 mm Hg.

U.S. Pat. No. 5,106,754 discloses that total organic carbon (TOC) and total inorganic carbon (TIC) monitoring of water is useful in determining the water quality. Conventional TOC and TIC monitoring techniques are not zero gravity compatible. The addition of microporous hydrophobic bladders in combination with a non-dispersive infrared analyzer allow for a two-phase, liquid and gas, zero gravity compatible TOC monitoring technique.

U.S. Pat. No. 5,116,507 discloses a method of treating an aqueous liquor, such as effluent liquor formed during coal gasification. The method comprises subjecting the liquor to dephenolation and ammonia stripping treatment to remove phenolic compounds and "free" ammonia from the liquor and then subjecting the resulting liquor, which still contains ammonium compounds and thus "fixed" ammonia, to reverse osmosis treatment to produce a permeate which is substantially free from impurities, including fixed ammonia.

U.S. Pat. No. 5,250,183 discloses an apparatus for manufacturing ultra-pure water, characterized in that a decarbonator/degassor and a reverse osmosis equipment for pretreatment of supply water are installed in the upper stream of a multiple effect evaporator.

U.S. Pat. No. 5,254,143 discloses a diaphragm for gas-liquid contact comprising a membrane having two surfaces, at least one surface of the membrane is hydrophilic and surfaces of micropores present in the membrane are hydrophobic. The diaphragm is used in contact apparatus in which a liquid is contacted with the hydrophilic surface of the membrane and a gas is contacted with the other surface.

U.S. Pat. No. 5,306,427 discloses a process for the separation of one or more, more permeable components from one or more, less permeable components in a feed stream. The process suggests two membrane separation stages in series wherein the feed is introduced into the low pressure side of the first stage, the permeate stream from the first stage is compressed and introduced into the high pressure side of the second stage and wherein the non-permeate stream from the second stage is recycled to the high pressure side of the first stage.

U.S. Pat. No. 5,413,763 discloses a method and apparatus for the measurement of the total organic carbon (TOC) content of a liquid. The inorganic carbon in the liquid is converted into carbon dioxide and removed from it. At the same time, oxygen is added to the liquid. The liquid is then exposed to ultraviolet radiation and the organic carbon thereby oxidized.

Japanese Patent 4-176303 discloses a gas-permeable membrane module containing a hollow fiber-shaped hydrophobic gas-permeable membrane used to remove the gas dissolved in a liquid. The liquid is supplied from an inlet, passed through the inside of the membrane from the membrane opening and sent to the other end of the membrane. A carrier gas is introduced from an outlet, passed around the bundle of the membranes and discharged from an outlet. The outlet is connected under these conditions to a vacuum source such as a vacuum pump, hence the gas dissolved in the liquid permeates through the membrane to the outside, and degasification is performed with high efficiency.

In U.S. Pat. No. 5,156,739, it is disclosed that water to be purified and degassed is passed through a reverse osmosis step from which a pure water stream and a high pressure waste water stream are produced. The high pressure waste water is passed through an eductor to produce a vacuum. The pure water stream is passed into a first volume of a degassifier and the vacuum is directed to a second volume of the degassifier. The first and second volume of the degassifier are separated by a hydrophobic membrane.

It will be seen that in spite of these disclosures, there is still a great need for a process that permits economical and efficient removal of carbon dioxide and/or ammonia as well as other ions from both weak and strongly ionized material to a very low level from water without further contamination to provide high purity water having a resistivity in the range of 2 to 10 megohm-cm useful for pharmaceutical uses, for example.

SUMMARY OF THE INVENTION

It is an object of the invention to provide a process for producing high purity water.

It is another object of the invention to provide an improved process for removing carbon dioxide and/or ammonia and other weakly ionized material from water.

Yet, it is another object of the invention to provide a process utilizing reverse osmosis membranes for removing carbon dioxide and/or ammonia and other impurities from water by adjusting pH and removing their equilibrium constituents.

Still, it is another object of this invention to provide at least one reverse osmosis membrane and adjust the feedwater thereto to a basic solution to drive the ionization equilibrium to ionize weakly ionizable material and thereafter adjust the permeate therefrom to an acidic solution to drive the ionization equilibrium to ionize weakly ionizable material.

And still, it is another object of this invention to provide double pass reverse osmosis membranes and to adjust the pH of the feed material to each membrane to selectively remove weakly ionized material by driving the equilibrium reaction to produce ionized material removable by the membranes thereby removing weakly ionized material such as carbon dioxide and/or ammonia from water to provide high purity water having a resistivity of 2 to 10 megohm-cm or greater.

Still further, it is an object of the present invention to provide feedwater to a first reverse osmosis membrane module adjusted to a pH in the range of 8 to 9.5 and to adjust the permeate from the first reverse osmosis membrane to a pH in the range of 5.5 to 7 as feed for a second reverse osmosis membrane module to produce permeate therefrom having a resistivity in the range of 2 to 10 megohm-cm or greater.

These and other objects will be apparent from the specification, claims and drawings appended hereto.

In accordance with these objects, there is provided a process for purifying water by removing dissolved materials therefrom, the process capable of producing purified water having a resistivity in the range of 2 to 10 megohm-cm or greater. The process comprises providing a water feed stream to be purified and adjusting the pH of the water feed stream to provide a basic water solution to drive the equilibrium of a first weakly ionized material to become ionized in the basic solution. The basic water solution is introduced to a high pressure side of a first reverse osmosis membrane module and water is passed through the first reverse osmosis membrane thereby providing a first retentate having ions from the first weakly ionized material concentrated therein and a first permeate depleted in ions from the first weakly ionized material. The pH of the first permeate is adjusted to provide an acidic water solution to drive the equilibrium of a second weakly ionized material to become ionized in the acidic solution. The acidic water solution is transferred to the high pressure side of a second reverse osmosis membrane and the acidic water solution is purified by passing at least a portion thereof through the second reverse osmosis membrane thereby providing a second retentate containing ions of the second weakly ionized material ionized in said acidic solution and to provide a second pelmeate depleted in the ions from the second weakly ionized material, the second permeate having a resistivity in the range of 1 to greater than 10 megohm-cm.

DETAILED DESCRIPTION OF THE PREFERRED EMBODIMENTS

Figure 1:
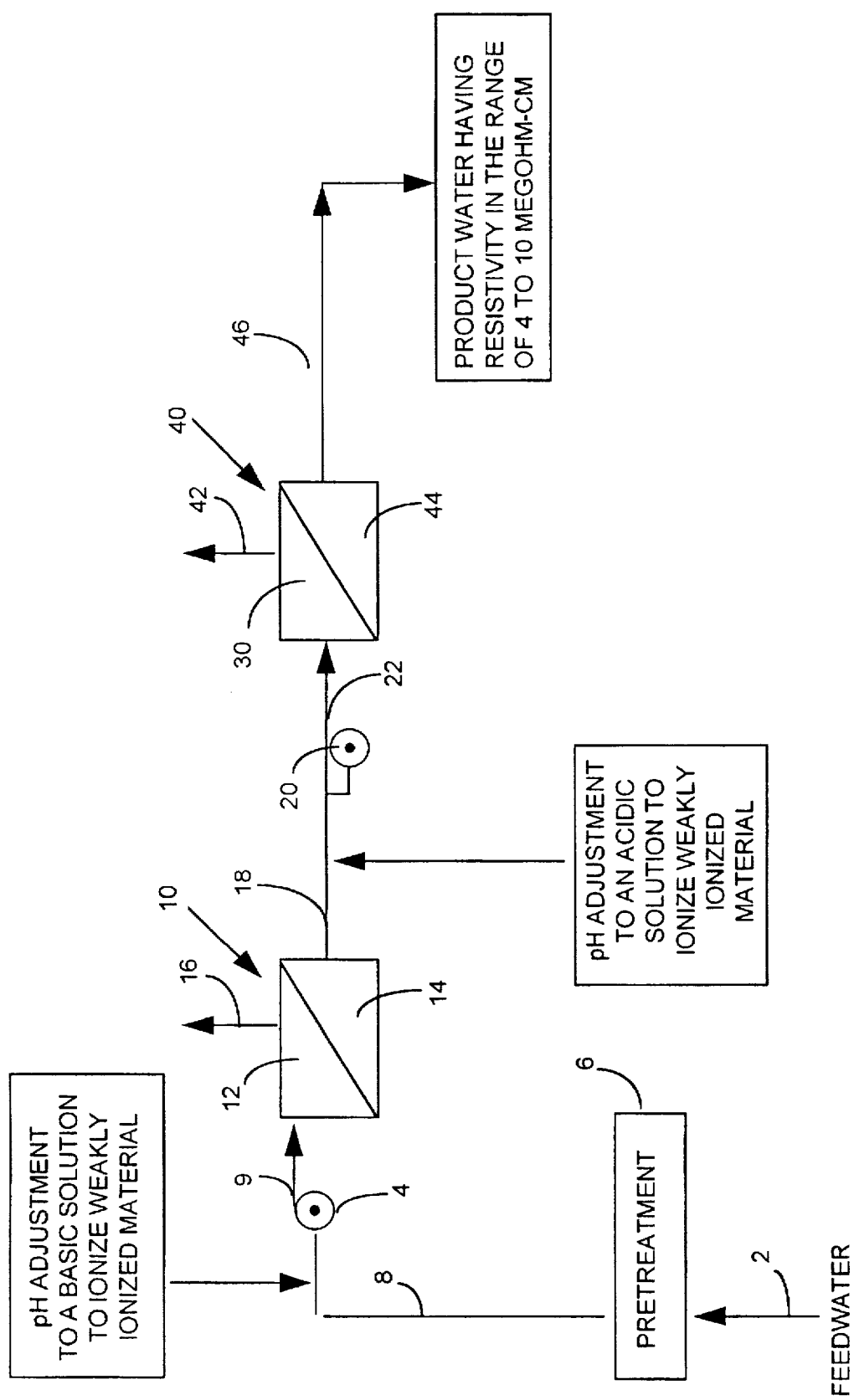
FIG. 1 is a schematic representation of the process of the invention showing first and second reverse osmosis operations and adjustments to remove weakly ionized material.

Feedwater is introduced along line 2 through pretreatment step 6 to line 8. Pump 4 transfers feedwater from line 8 along line 9 to high pressure side 12 of reverse osmosis unit 10. Prior to entering high pressure side 12, the pH of the feedwater is adjusted to ensure that the feedwater introduced to the high pressure side has a controlled pH range. The adjustment can be made before or after pump 4 but is generally accomplished before pump 4. Normally, adjustment is made by adding a basic material to change the pH to a controlled range to ionize weakly ionized material. Retentate having concentrated ions from weakly ionized material as well as other ions is removed along line 16. Permeate from low pressure side 14 of first reverse osmosis membrane module 10 is transferred along line 18 to pump 20 before being pumped along line 22 to high pressure side 30. Prior to being introduced to pump 20, an adjustment is made to the pH of the permeate to lower the pH to an acidic pH. This adjustment is necessary to ionize remaining weakly ionized materials that are not ionized in the basic solution. After the pH adjustment to acidic conditions, pump 20 then pumps the liquid into high pressure side 30 of second reverse osmosis membrane unit 40. In unit 40, the ions from the weakly ionized materials as well as other ions that pass through first membrane unit 10 are concentrated in the retentate of high pressure side 30 of unit 40 and removed along line 42. A portion of the water introduced to high pressure side 30 is removed as permeate in low pressure side 44 to provide high purity product water having a resistivity in the range of about 2 to 10 megohm-cm and typically 4 to 10 megohm-cm or higher.

The feedwater which can be purified to high levels of purity in the present invention can include suiface water such as river water and water from reservoirs and lakes, for example. In many instances, it is preferred to soften the feed water prior to introducing it to the first primary reverse osmosis step. Generally, these sources of water contain magnesium, calcium, sodium, potassium, barium, aluminum and strontium cations with the magnesium and calcium usually being present at higher levels, depending on the source. Usually, ground water supplies contain calcium and magnesium as the primary cations and bicarbonate (with associated carbon dioxide) and sulfate as the primary anions. Sodium and chloride levels are usually less than 20 to 25% of the total cation and anion concentrations for ground waters.

Because of the presence of scale forming cations, such as magnesium and calcium, membrane scaling can occur in the primaly reverse osmosis module 10. Thus, for purposes of the invention, it is preferred to pretreat the feedwater to remove the scale forming cations. Conventionally, such pretreatments include water softening. However, this has the disadvantage that large quantities of salt are required for regeneration of the softener. Thus, for purposes of the present invention, pretreatment of the feedwater utilizing a softening or nanofiltration membrane is also acceptable. The nanofiltration membrane operates at about ¼ to ⅓ the pressure (e.g., 60 to 120 psig) required for a reverse osmosis membrane used for purifying brackish water. Thus, nanofiltration can be used for pretreatment of the feedwater to remove scale forming precipitates, colloidal and organic material which would operate to foul the primary reverse osmosis membrane. The nanofiltration membrane is effective in removing up to about 80% of the large ionic radius ions and radicals, such as calcium, magnesium, sulfate and to a lesser extent, bicarbonate. Sodium and chloride ions, because of their small ionic radius, are not effectively removed (about 20 to 40% by nanofiltration). Thus, if caustic is used to adjust the pH of the feedwater, water softening or nanofiltration should be used to remove multivalent cations. The use of nanofiltration as a pretreatment has the advantage over conventional softening of not requiring the use of large quantifies of regenerant salt or the disposal of regenerant waste solutions. Further, the use of nanofiltration as a pretreatment has the advantage that fouled nanofiltration membranes are much easier to clean when compared to conventional reverse osmosis membranes.

Nanofiltration membranes useful in the present invention are available from Filmtec, A division of Dow Chemical Company under the designation NF-40 or NF-70. Typically, nanofiltration membranes useful in the invention have a pore size in the range of 0.005 to 0.05 µm, and preferably 0.008 to 0.02 µm. In the present invention, nanofiltration is preferred for pretreatment of feedwater having a total dissolved solids of 200 ppm or greater and high percent hardness, e.g., 75% or greater, due to cations such as calcium and magnesium ions. The nanofiltration operates to remove 50 to 80% of the scale-forming precipitates.

Also, an activated carbon pretreatment may be provided to remove a portion of the naturally occurring materials and residual disinfectant such as chlorine and chloramine compounds which result from the addition of ammonia to water to reduce high trihalomethane levels resulting from chlorination and the reaction of chlorine with organics such as humic acid.

In deionization, weakly ionized substances are removed by strong attraction of an ionic species to an exchange site. This upsets the chemical equilibrium and forces un-ionized material associated with weakly ionized material to an ionic state. However, reverse osmosis which tends to be a rapid process does not upset equilibrium of weakly ionized material.

It has been discovered that the presence of weakly ionized material has a dramatic effect on product water purity. However, the un-ionized portion of a weakly ionized material is not removed by reverse osmosis, but will pass through the reverse osmosis membrane and re-establish an equilibrium in the permeate product water from the system. The degree of ionization associated with a particular equilibrium is, for reverse osmosis applications, pH dependent. Two of the equilibriums for weakly ionized material which are important to the chemistry of reverse osmosis and are very difficult to remove to a low level to provide high purity water are as follows:

1. Carbon dioxide-bicarbonate-hydroxide equilibrium $$CO_2 + 2H_2O \rightleftharpoons H_3O^+ + HCO_3^-$$

$$HCO_3^- + H_2O \rightleftharpoons H_3O^+ + CO_3^-$$

2. Ammonium Equilibrium $$NH_3 + H_2O \rightleftharpoons NH_4^+ + OH^-$$

In equation 2, the ammonium equilibrium is less significant at low pH, e.g., pH equal to 5.5, because the hydroxide ion produced by the reaction is rapidly depleted by injection of the acid to the pH 5.5 value. That is, the hydroxyl ion and hydronium ion react to produce water per the following equation:

$$H_3O^+ + OH^- \rightarrow 2H_2O$$

The removal of the hydroxide ion forces this equilibrium to the right, eliminating the presence of ammonia by complete conversion to the ammonium ion. In this situation, the reverse osmosis system will reject ionic material but will allow ammonia gas to pass through. As an example, at a pH of approximately 9.0, one mole of ammonia gas is present, in equilibrium, for each mole of ammonium ion. Since the reverse osmosis membrane will only remove ammonium ion, the remaining ammonia gas, equal in concentration to the initial ammonium ion concentration will reestablish an equilibrium in the permeate product water from the second reverse osmosis unit, significantly decreasing the purity of the product.

For the carbon dioxide-bicarbonate-hydroxide equilibrium at a pH of 5.5, significant amounts of carbon dioxide are present because reduction of the pH will add hydronium ions to the solution, forcing the equilibrium associated with $CO_2$ and bicarbonate to the left. The following table shows the effect of pH on bicarbonate and free carbon dioxide values.

| pH | Relative $HCO_3^-$ Concentration | Relative $CO_2$ Concentration |
|---|---|---|
| 9.0 | 670 | 1 |
| 8.5 | 220 | 1 |
| 8.0 | 67 | 1 |
| 7.5 | 22 | 1 |
| 7.0 | 6.7 | 1 |
| 6.5 | 2.0 | 1 |
| 6.0 | 0.67 | 1 |
| 5.5 | 0.20 | 1 |
| 5.0 | 0.07 | 1 |

When the pH is decreased to a value of 5.5, the equilibrium between carbon dioxide and bicarbonate is such that approximately 1/6 of the material is ionized while 5/6 is in a gaseous state. At high pH values, such as a pH of 9.0, the bicarbonate value is 670 times the carbon dioxide value. Typically, for water supplies, the bicarbonate concentration is less than 200-300 ppm. The value is generally expressed as the Methyl Orange (MO) alkalinity. Assuming that the pH of the solution was 9.0 and that the bicarbonate concentration of the feedwater was 200 ppm, the carbon dioxide concentration would be 0.3 ppm. After re-establishment of an equilibrium in the product water from the reverse osmosis system, the resulting bicarbonate concentration associated with $CO_2$ conversion is about 0.4 ppm.

It was discovered that a portion of unionized material or weakly ionized material remained in the permeate after a first pass reverse osmosis treatment by titrating a sample of permeate. The sample was titrated using 0.01 normal sulfuric acid solution until a pH of 5.0 was noted. The sample required 2.37 mls to reduce the pH from 9.12 to 6.50. Calculation indicated that the calculated volume of acid for this reduction should only be 1.36 mls. This clearly shows that weakly ionized material is present. The weakly ionized material remained until the titration was initiated. As the solution was titrated, the equilibrium was forced to convert un-ionized material in the sample to ions. The excess acid required over the calculated amount for this particular sample was 42.6% greater than that required if all compounds present were totally ionized. Also, an increase in conductivity is observed as the pH is decreased, indicating that previously unionized material is converted to ionic material.

With respect to ammonia, its presence often results from disinfecting water with chlorine and ammonia (chloramines) to reduce trihalomethane levels. However, activated carbon pretreatments prior to reverse osmosis to remove residual chloramine compounds do not remove ammonia. Thus, ammonia, in gaseous form, can pass directly through a reverse osmosis membrane. The ammonia complex, even in trace quantities, provides a reservoir of un-ionized material associated with weakly ionized ammonia. Thus, for purposes of the invention, it is desirable to reduce the pH to ionize ammonia to a form which can be removed by a reverse osmosis membrane.

In accordance with the present invention, after the pretreatment, the pH of the feed water is adjusted to a pH in the range of about 7.5 to 10.5, preferably 8 to 9.5. Typically, the pH of the feedwater is adjusted by injecting a solution of caustic material into line 8 prior to pump 4. As noted, increasing the pH has the effect of ionizing weakly ionized material such as $CO_2$ and thus the ion form is more effectively rejectable by the reverse osmosis membrane. Other bases may be used, including potassium hydroxide, trisodium phosphate, disodium phosphate, sodium bicarbonate and sodium carbonate.

It is important to adhere to these pH ranges. Further, it is important to adjust the pH in the sequence noted. That is, the higher pH is used prior to the first reverse osmosis treatment and the lower pH is used prior to the second reverse osmosis treatment.

After adjusting the pH of the pretreated feedwater, it is introduced to high pressure side 12 of membrane module 10 where the ionized material, such as sodium, chloride, sulfate, bicarbonate and silica, as well as other ions, are rejected and removed along line 16. Permeate produced at low pressure side 14 is substantially free of these ions. However, as noted earlier, certain materials such as ammonia do not disassociate well at high pH and thus pass through the first membrane in gaseous form. Thus, ammonia in the water is not removed in first reverse osmosis unit 10.

Even if subjected to a second reverse osmosis, the ammonia will pass through the membrane. However, it has been discovered that if the permeate from first reverse osmosis unit 10 is acidified, weakly ionized materials remaining in the permeate, such as ammonia, become ionized. The ionized material is subject to removal or rejection and concentrated by the membrane in reverse osmosis unit 40. The concentrate may be removed along line 42.

For purposes of the present invention, preferably the pH of the permeate from first reverse osmosis unit 10 is reduced to a pH less than 7, preferably a pH in the range of about 5 to 7 with the most preferred range being about 5.5 to 6.5. It is important to adhere to these pH ranges. If a pH higher than 7 is used, the quality of the product water from the second reverse osmosis unit will decrease because all of the un-ionized material is not converted to ionized form. At a pH of less than 5, the quality of the product water from the second pass reverse osmosis unit also decreases. It is believed that this decrease is associated with the presence of the hydronium ion which has a very high equivalent conductance.

Any method of lowering the pH of the permeate from first reverse osmosis unit 10 may be used. However, it is preferred to use a method that will introduce the minimum amount of ionic material while reducing the pH. The pH reduction to the desired range can be obtained by cation polishing with a bypass valve, acid injection or use of an electrolytic half cell.

Cation polishing lowers the pH by removing ions such as sodium ions which is the primary cation present in the permeate of the first pass reverse osmosis which normally contains about 7–15 ppm TDS. The cation polisher contains a strong acid cation exchange resin in the hydronium form. As the water passes through the cation polisher, cations (principally sodium) will be removed, and hydronium ion released, as in the following reaction:

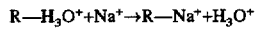

$$R\!-\!H_3O^+ + Na^+ \rightarrow R\!-\!Na^+ + H_3O^+$$

The hydronium ion neutralizes excess hydroxide ion in the first pass product water pH (permeate from the first pass reverse osmosis), and eventually begins to produce product water with a pH less than 7.0. The cation polisher can introduce more hydronium ions than needed, resulting in a pH of 4–5. To minimize this situation, a bypass throttling valve is positioned around the cation polisher. The valve is throttled open or shut to adjust the pH to a value of 6.0–6.5, for example.

Acids that may be used include sulfuric, hydrochloric and nitric. It is preferred to use an acid such as sulfuric acid because the sulfate radical has relatively large ionic radius and is easier to reject than a small ion such as chloride from hydrochloric acid.

Examples of electrolytic half cells that may be used are provided in articles entitled "The Production of Pharmaceutical Grades of Water Using Continuous Deionization Post-Reverse Osmosis" by Gary C. Ganzi et al and "State-of-the-Art of the Electroldialysis Reversal (EDR) Process In 1983", by William E. Katz, incorporated herein by reference.

After the permeate from first reverse osmosis unit 10 is adjusted to the required pH range, it is introduced to the high pressure side of reverse osmosis unit 40 or is re-pressurized and fed to unit 40. The ions of weakly ionized material are concentrated in high pressure side 30 and removed along line 42. Line 42 may be recirculated to line 8 or line 18 for re-introduction to the process. High purity water is removed from low pressure side 44 along line 46.

The amount of weakly ionized material in the permeate from first reverse osmosis unit 10 can range from 0 to 20 ppm. As well as weakly ionized material, the permeate from unit 10 can contain ions such as sodium, chloride, sulfate and bicarbonate. Typically, such ions are present in the range of 1 to 25 ppm.

While unit 10 is shown as a single reverse osmosis unit, a pair of parallel connected reverse osmosis units can be used and the permeate from both units can be combined for introducing to the high pressure side of unit 40.

Suitable membranes that can be utilized in reverse osmosis units 10 and 40 are available from Filmtec, a division of Dow Chemical Company, under the designation BW30-4040(10) and/or BW30HR-4040(40).

Further, while two units 10 and 40 have been shown, unit 10 can be set up in series with the retentate from the second unit returned and reintroduced to the first unit to ensure effective removal of ions. Likewise, unit 40 can be comprised of two reverse osmosis units connected in series with the retentate recirculated to the high pressure side of the first unit comprising unit 40 to ensure higher levels of purity where desired.

In certain instances, when the alkalinity of the feedwater is extremely high, e.g., 200 ppm or greater, it may be desirable to subject the permeate from unit 10 to a gas-liquid separation step after reducing the pH to acidic conditions.

Figure 2:
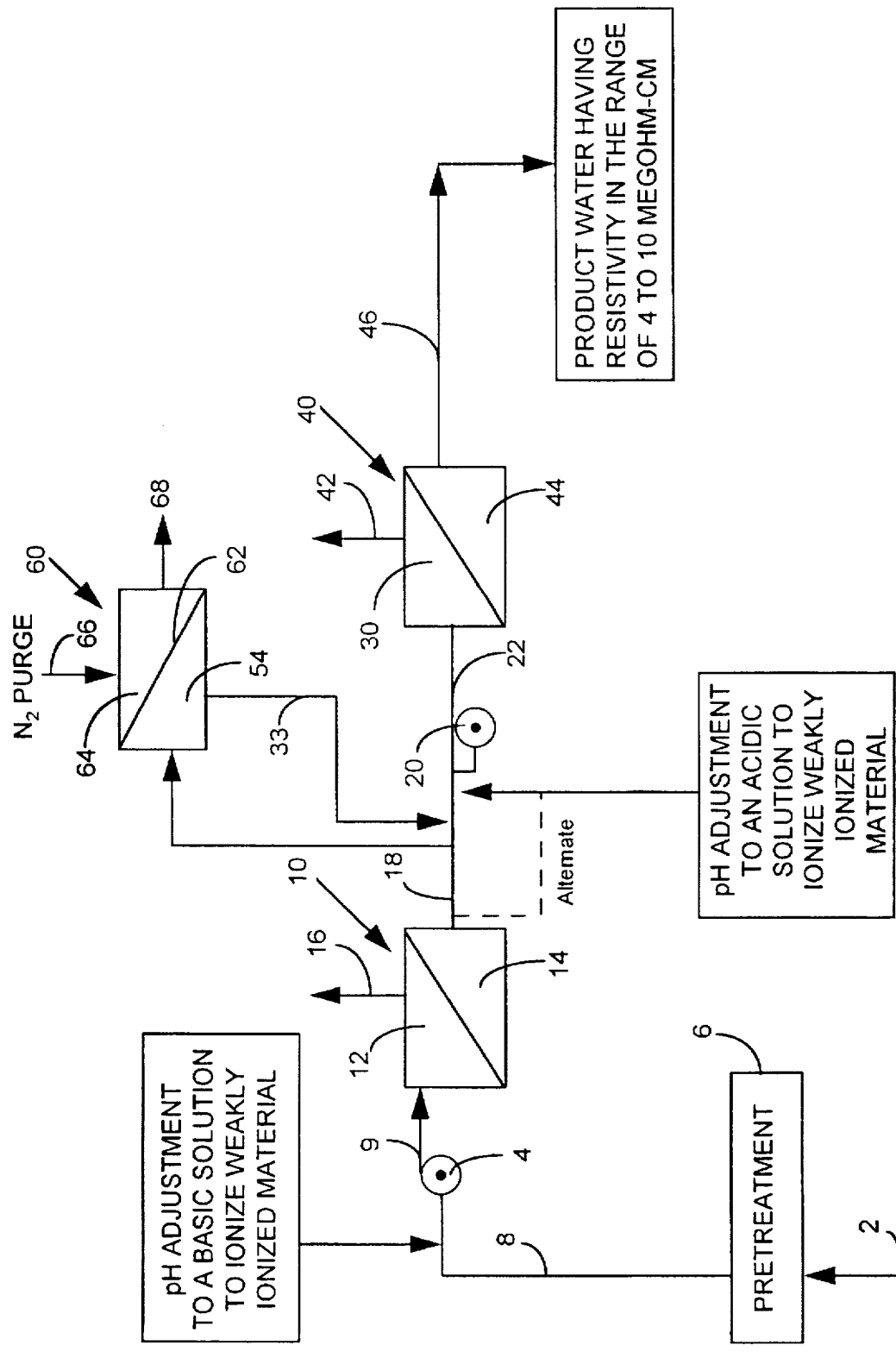
FIG. 2 is a schematic representation of the process of the invention as referred to in FIG. 1 incorporating an interstage hydrophobic membrane.

In accordance with this aspect of the invention, permeate from primary reverse osmosis units 10 (FIG. 2) is introduced to high pressure side 54 of gas-liquid separation module 60. In gas-liquid separation module 60, a membrane 62 is provided for separating the carbon dioxide and/or ammonia from the water to provide a permeate depleted in these materials. Membrane 62 is a hydrophobic membrane permeable by carbon dioxide and/or ammonia. That is, carbon dioxide and/or ammonia pass through the hydrophobic membrane and in this way at least a portion thereof is separated from liquid in high pressure side 54.

In the present invention, the permeate from reverse osmosis unit 10 can be either basic or acidic before being introduced to high pressure side 54 of gas-liquid separation module 660. That is, the permeate can be introduced to side 54 under basic or acidic conditions.

For purposes of enhancing removal of $CO_2$ from the permeate from primary reverse osmosis units 10, the pH of the permeate may be adjusted to a pH in the range of about 4.5 to 8, preferably 5 to 7.5, where $CO_2$ gas is more prevalent before being introduced to high pressure side 54 of hydrophobic membrane unit 60 to ensure the highest level of $CO_2$ removal. For purposes of enhancing $NH_3$ removal from the permeate from plimary reverse osmosis unit 10, the pH of the permeate may be adjusted to a pH of 8 or greater, e.g., 8 to 11, typically pH in the range of 8 to 10 prior to being introduced to high pressure side 54 of hydrophobic membrane unit 60 to ensure highest removal of $NH_3$.

It may be desirable in certain instances to use two hydrophobic membranes in series. That is, the first hydrophobic membrane can have the pH adjusted to maximize the removal of $CO_2$, e.g., pH in the range of 5.5 to 7.5. The second hydrophobic membrane can have the pH of the retentate from the first hydrophobic membrane adjusted upwardly, e.g., pH in the range of 8 to 10, to favor removal of $NH_3$ gas. Thereafter, the pH of the retentate from the second hydrophobic membrane unit may be adjusted to acidic or neutral conditions for feed to second pass reverse osmosis unit 40. The order of removing $CO_2$ and $NH_3$ in separate hydrophobic membrane units may be reversed if the permeate from the first pass reverse osmosis 10 has a basic pH. This avoids a step of pH manipulation.

Because the rate of removal of carbon dioxide and/or ammonia through the membrane is dependent on the rate of migration of the carbon dioxide or ammonia to the membrane surface pores, it is preferred that liquid baffling or mixing action be applied to the liquid in high pressure side 54 to continually provide or contact the membrane surface pores with new or fresh liquid. Additionally, an inert gas sparge, e.g., argon, may be applied to provide stirring and provide a fine bubble surface into which carbon dioxide or ammonia can migrate. The argon sparge may be removed through the hydrophobic membrane carrying with it carbon dioxide or ammonia occluded therewith.

For purposes of removing carbon dioxide or ammonia that has permeated membrane 62, a nitrogen purge or sweep that removes carbon dioxide or ammonia from the surface of membrane 62 in low pressure side 64 may be employed. It should be understood that permeate side or low pressure side 64 of membrane 62 is free of liquid and thus permits a gas purge. Liquid on the permeate side is harmful to the present invention because it can interfere with the hydrophobicity characteristics of membrane 62. Another disadvantage of maintaining liquid in the low pressure side is the fluctuation or change in pressure. This is particularly hazardous to the life of the membrane.

The gas, e.g., nitrogen, purge may be introduced along line 66 and removed along line 68 for purposes of sweeping carbon dioxide or ammonia from the permeate side of the membrane. In the present invention, it is preferred to maintain the pressure in low pressure side 64 at about atmospheric pressure. This has the advantage of greatly extending membrane life.

As a further aid to removing carbon dioxide or ammonia from liquid in high pressure side 54, low pressure side 64 may be subjected to a vacuum. The level of vacuum applied should be just less than that which will remove carbon dioxide or ammonia which has passed through the membrane, increasing the driving force for the removal. That is, vacuum level should be adequate to remove carbon dioxide and/or ammonia gas and yet sufficiently low to avoid pulling water through the microporous gas-liquid membrane. For purposes of design, the membrane is preferred to be located so as to minimize the static pressure or intrusion pressure exerted by the liquid.

Any type of membrane that resists penetration by liquid on the high pressure side and which is permeable by carbon dioxide and/or ammonia may be used for hydrophobic membrane 62. While hydrophobic membranes with high resistance to intrusion pressure are preferred, the membrane should exhibit a porous structure which permits contact with the liquid and passage of the gases such as carbon dioxide and ammonia. Hydrophobic material useful in the invention is that having a contact angle with water of greater than 90°. Such hydrophobic materials include polyolefins, fluorine resins and chlorine containing resins; silicone resins; polysulfone and polyphenylene sulfide. Materials suitable for the hydrophobic membrane include teflon (polytetro fluoroethylene), polysulfphene, polyethylene and polyvinylidene fluoride. The preferred material for membrane 62 is comprised of teflon because of its high resistance to intrusion or permeation by water. By intrusion pressure is meant the pressure to be overcome to force liquid through the membrane. For purposes of the present invention, it is preferred that the hydrophobic membrane have a pore size in the range of 0.05 to 1.5 μm. A support material such as polypropylene may be used for the membrane.

In the method of the invention, carbon dioxide can be reduced from about 0.5 to 20 ppm to a level of about 0.1 to 0.2 ppm if installed downstream of pH reduction.

After carbon dioxide and/or ammonia is removed in unit 60 to the desired level, retentate from high pressure side 54 is then transferred along line 33 to high pressure side 30 of unit 40.

The following example is further illustrative of the invention:

EXAMPLE

Samples of feedwater having a pH in the range of about 9 to 10 were processed in accordance with the invention. In the samples, the TDS was measured before the first pass reverse osmosis and the TDS and the pH were measured for the permeate from the first pass reverse osmosis. The pH of the permeate was adjusted as noted for feed to the second pass reverse osmosis. The conductivity is provided for the permeate or product water from the second pass reverse osmosis. From the Table, it will be noted that when the permeate from the first pass reverse osmosis was adjusted to an acidic pH, the conductivity of the permeate or product water dropped to less than 0.2 microsiemens/cm (μS/cm) or a resistivity of greater than 5.0 megohm-cm. In each sample, the permeate from the first pass reverse osmosis was acidified by adding cation polishing.

Sample 9 shows that as the pH is decreased below 5.5, the conductivity increases. Also, sample 10 shows that as the pH is increased above 6.5, the conductivity increases.

TABLE

| Sample No. | Feedwater TDS | First Pass Permeate | | pH Adjusted | Permeate From Second Pass RO Final Product | |
|---|---|---|---|---|---|---|
| | | TDS (ppm) | pH | Feed For Second Pass RO | Conductivity (μs/cm) | Resistivity megohm-cm |
| 1 | 115 | 20.5 | 10.2 | 10.2 | 18.9 | 0.053 |
| 2 | 110 | 23.0 | 10.1 | 10.1 | — | — |
| 3 | 110 | 12.5 | 10.2 | 10.2 | — | — |
| 4 | 110 | 12.5 | 10.0 | 10.0 | 19.7 | 0.051 |
| 5 | 125 | 20.0 | 10.0 | 10.0 | 17.6 | 0.057 |
| 6 | 120 | 15.0 | 10.0 | 6.0 | 1.6 | 0.625 |
| 7 | 120 | 14.0 | 9.9 | 9.6 | 8.9 | 0.112 |
| 8 | 130 | 4.5 | — | 6.5 | 0.25 | 4.00 |
| 9 | 130 | 6.0 | — | 4.8 | 0.90 | 1.11 |
| 10 | 130 | 7.5 | — | 7.1 | 0.50 | 2.00 |
| 11 | 140 | 7.5 | 9.1 | 4.9 | 0.90 | 1.11 |
| 12 | 145 | 19.5 | 9.7 | 8.8 | 8.8 | 0.114 |
| 13 | 140 | — | 9.9 | 9.1 | 1.0 | 1.00 |
| 14 | 145 | 8.0 | 9.6 | 5.1 | 4.4 | 0.227 |
| 15 | 155 | 14.5 | 10.0 | 9.3 | 15.0 | 0.067 |
| 16 | 157 | 12.5 | 9.9 | 9.3 | 11.0 | 0.091 |
| 17 | 160 | 13.0 | 9.9 | 6.5 | 0.17 | 5.88 |
| 18 | 165 | 14.0 | 9.9 | 6.3 | 0.11 | 9.09 |
| 19 | 167 | 16.5 | 10.1 | 6.9 | 0.14 | 7.14 |
| 20 | 170 | 16.0 | 10.0 | 6.3 | 0.15 | 6.67 |

TABLE-continued

| | | First Pass Permeate | | pH Adjusted | Permeate From Second Pass RO Final Product | |
|---|---|---|---|---|---|---|
| Sample No. | Feedwater TDS | TDS (ppm) | pH | Feed For Second Pass RO | Conductivity (μs/cm) | Resistivity megohm-cm |
| 21 | 175 | 14.0 | 9.9 | 9.7 | 9.5 | 0.105 |
| 22 | 177 | 30.0 | 9.9 | 8.7 | 2.1 | 0.576 |

While the invention has been described in terms of preferred embodiments, the claims appended hereto are intended to encompass other embodiments which fall within the spirit of the invention.

What is claimed is:

1. A process for purifying water by removing dissolved materials therefrom, the process capable of producing purified water having a resistivity in the range of 4 to 10 megohm-cm or greater, comprising the steps of:
   (a) providing a water feed stream to be purified;
   (b) adjusting the pH of the water feed stream to a basic water solution having a pH in the range of 7.5 to 10.5 in order for a first weakly ionized material comprised of carbon dioxide to become ionized in a basic solution;
   (c) introducing said basic water solution to a high pressure side of a first reverse osmosis membrane;
   (d) passing water through said first reverse osmosis membrane to provide a first retentate having ions therein from said first weakly ionized material concentrated therein and a first permeate depleted of ions from said first weakly ionized material;
   (e) adjusting the pH of said first permeate to an acidic water solution in order for a second weakly ionized material comprised of ammonia to become ionized in an acidic solution;
   (f) transferring said acidic water solution to the high pressure side of a second reverse osmosis membrane; and
   (h) further purifying said acidic water solution by passing at least a portion thereof through said second reverse osmosis membrane to provide a second retentate containing ions of said second weakly ionized material ionized in said acidic solution and a second permeate, the second permeate having high resistivity.

2. The process in accordance with claim 1 including adjusting the pH of the first permeate to a pH in the range of 5 to 7.

3. The process in accordance with claim 1 including adjusting the pH of the first permeate to a pH in the range of 5.5 to 6.5.

4. The process in accordance with claim 1 including adjusting the pH of the water feed stream by adding a hydroxide material.

5. The process in accordance with claim 1 including subjecting said water feed stream to a nanofiltration step prior to adjusting the pH of said water feed stream.

6. The process in accordance with claim 1 including adding sulfuric acid to said first permeate for purposes of adjusting said pH to provide said acidic solution.

7. The process in accordance with claim 1 including the step of adding said first permeate to the high pressure side of a hydrophobic membrane to provide a carbon dioxide and/or ammonia depleted retentate.

8. The process in accordance with claim 7 including adjusting the pH of said first permeate to an acidic condition prior to the step of adding said first permeate to the high pressure side of said hydrophobic membrane.

9. The process in accordance with claim 1 wherein said basic water solution has a pH in the range of 8 to 9.5.

10. A process for purifying water by removing dissolved materials therefrom, the process capable of producing purified water having a resistivity in the range of 4 to 10 megohm-cm or greater, comprising the steps of:
    (a) providing a water feed stream to be purified;
    (b) adjusting the pH of the water feed stream to a basic water solution in order for a first weakly ionized material comprised of carbon dioxide to become ionized in a basic solution;
    (c) introducing said basic water solution to a high pressure side of a first reverse osmosis membrane;
    (d) passing water through said first reverse osmosis membrane to provide a first retentate having ions therein from said first weakly ionized material concentrated therein and a first permeate depleted of ions from said first weakly ionized material;
    (e) adjusting the pH of said first permeate to an acidic water solution having a pH in the range of 5 to 7 in order for a second weakly ionized material comprised of ammonia to become ionized in an acidic solution;
    (f) transferring said acidic water solution to the high pressure side of a second reverse osmosis membrane; and
    (h) further purifying said acidic water solution by passing at least a portion thereof through said second reverse osmosis membrane to provide a second retentate containing ions of said second weakly ionized material ionized in said acidic solution and a second permeate, the second permeate having high resistivity.

11. The process in accordance with claim 10 wherein the pH of the acidic water solution is 5.5 to 6.5.

12. A process for purifying water by removing dissolved materials therefrom, the process capable of producing purified water having a resistivity in the range of 4 to 10 megohm-cm or greater, comprising the steps of:
    (a) providing a water feed stream to be purified;
    (b) adjusting the pH of the water feed stream to a basic water solution having a pH in the range of 8 to 9.5 in order for a first weakly ionized material comprised of carbon dioxide to become ionized in a basic solution;
    (c) introducing said basic water solution to a high pressure side of a first reverse osmosis membrane;
    (d) passing water through said first reverse osmosis membrane to provide a first retentate having ions therein from said first weakly ionized material concentrated therein and a first permeate depleted of ions from said first weakly ionized material;
    (e) adjusting the pH of said first permeate to an acidic water solution having a pH in the range of 5.0 to 7 in order for a second weakly ionized material comprised of ammonia to become ionized in an acidic solution;

(f) transferring said acidic water solution to the high pressure side of a second reverse osmosis membrane; and (h) further purifying said acidic water solution by passing at least a portion thereof through said second reverse osmosis membrane to provide a second retentate containing ions of said second weakly ionized material ionized in said acidic solution and a second permeate, the second permeate having high resistivity.

13. In a process for purifying a water feed stream by removing dissolved materials therefrom, including weakly ionized material using reverse osmosis membranes, the process capable of producing purified water having a resistivity in the range of 4 to 10 megohm-cm, the improvement wherein:

(a) the water feed stream is provided as a basic water solution in order for a first weakly ionized material comprised of carbon dioxide to become ionized in a basic solution;

(b) introducing said basic water solution to a high pressure side of a first reverse osmosis membrane;

(c) passing water through said first reverse osmosis membrane to provide a first retentate having ions therein from said first weakly ionized material concentrated therein and a first permeate depleted of ions from said first weakly ionized material;

(d) adjusting the pH of said first permeate to an acidic water solution in order for a second weakly ionized material comprised of ammonia to become ionized in an acidic solution;

(e) transferring said acidic water solution to the high pressure side of a second reverse osmosis membrane; and (f) further purifying said acidic water solution by passing at least a portion thereof through said second reverse osmosis membrane to provide a second retentate containing ions of said second weakly ionized material ionized in said acidic solution and a second permeate, the second permeate having high resistivity.

14. The process in accordance with claim 13 including adjusting the pH of the water feed stream to a pH in the range of 7.5 to 10.5.

15. The process in accordance with claim 13 including adjusting the pH of the water feed stream to a pH in the range of 8 to 9.5.

16. The process in accordance with claim 13 including adjusting the pH of the first permeate to a pH in the range of 5 to 7.

17. The process in accordance with claim 13 including adjusting the pH of the first permeate to a pH in the range of 5.5 to 6.5.

18. In a process for purifing a water feed stream by removing dissolved materials therefrom, including weakly ionized material using reverse osmosis membranes, the process capable of producing purified water having a resistivity in the range of 4 to 10 megohm-cm, the improvement wherein:

(a) the water feed stream is provided as a basic water solution in the range of 8 to 9.5 in order for a first weakly ionized material comprised of carbon dioxide to become ionized in a basic solution;

(b) introducing said basic water solution to a high pressure side of a first reverse osmosis membrane;

(c) passing water through said first reverse osmosis membrane to provide a first retentate having ions therein from said first weakly ionized material concentrated therein and a first permeate depleted of ions from said first weakly ionized material;

(d) adjusting the pH of said first permeate to an acidic water solution having a pH in the range of 5 to 7 in order for a second weakly ionized material comprised of ammonia to become ionized in an acidic solution;

(e) transferring said acidic water solution to the high pressure side of a second reverse osmosis membrane; and (f) further purifying said acidic water solution by passing at least a portion thereof through said second reverse osmosis membrane to provide a second retentate containing ions of said second weakly ionized material ionized in said acidic solution and a second permeate, the second permeate having high resistivity.

* * * * *